United States Patent
Münzenberger

(12) 
(10) Patent No.: US 6,643,985 B2
(45) Date of Patent: Nov. 11, 2003

(54) TUBULAR LEAD-IN FIXTURE

(75) Inventor: Herbert Münzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/241,219

(22) Filed: Sep. 10, 2002

(65) Prior Publication Data
US 2003/0051423 A1 Mar. 20, 2003

(30) Foreign Application Priority Data
Sep. 17, 2001 (EP) .............................. 01810895

(51) Int. Cl.⁷ ................................................. E04C 2/00
(52) U.S. Cl. .............................. 52/232; 52/220.8; 52/1; 285/187
(58) Field of Search ................................. 52/232, 220.8, 52/250, 270, 602, 1, 573.1; 285/187, 65

(56) References Cited

U.S. PATENT DOCUMENTS

| 4,669,759 A | 6/1987 | Harbeke |
| 5,390,465 A | 2/1995 | Rajecki |
| 6,314,692 B1 | 11/2001 | Munzenberger |

FOREIGN PATENT DOCUMENTS

AU          0732683          4/2001

Primary Examiner—Carl D. Friedman
Assistant Examiner—Naoko Slack
(74) Attorney, Agent, or Firm—Sidley Austin Brown & Wood, LLP

(57) ABSTRACT

A tubular lead-in fixture including an attachment element (3) for a temporary attachment of the lead-in fixture, and an axially extending, radially widening region (8) provided within an embeddable length (L) of the lead-in fixture (1) and limited by spaced from each other, radial shoulders, and in which an intumescent mass (7) is received.

9 Claims, 2 Drawing Sheets

TUBULAR LEAD-IN FIXTURE

BACKGROUND OF THE INVENTION

1. Field of the Invention

The present invention relates to an embeddable in concrete, tubular lead-in fixture for insertion of conduits through walls formed of poured concrete, which lead-in fixture includes a mass intumescible in case of fire for sealing the opening through which a conduit extends.

2. Description of the Prior Art

Tubular lead-in fixtures of the type described above are widely used in the contemporary construction industry for insertion of conduits through walls which encompass side walls, ceilings, and floors.

U.S. Pat. No. 4,669,759 discloses an embeddable in concrete, sleeve-shaped tubular lead-in fixture which is formed of a plastic material and is temporarily secured, during preassembly, to a formwork of a later-to-be-poured wall with an end-side, outer attachment flange. At the attachment end, the lead-in fixture has a cavity in which a intumescent mass is received for closing, in case of fire, the opening through which the conduit extends. After the removal of the formwork, the intumescent mass lies bare at its axial end surface. As a result, the intumescent action spreads partially in the axial direction in case of fire, which limits the intumescent effect. Moreover, the free-lying cinder crust is not mechanically stabilized.

U.S. Pat. No. 6,161,873 discloses a lead-in fixture that has, in addition, at one of its axial ends, a circular metal disc for fire-proof limitation of the intumescent action to a small axially limited region and for mechanical stabilization of the cinder crust. The provision of the metal disc increases the manufacturing costs and the costs associated with the pre-mounting of the lead-in fixture. Considering wide use of this article, the increase in costs is rather significant.

U.S. Pat. No. 4,619,471 discloses a two-part embeddable tubular lead-in fixture formed of a plastic material and including a first sleeve-shaped section with an end side, outer attachment flange and a second sleeve-shaped section located in the first section within the embeddable length of the first section. There is no free space for receiving a coaxially arranged intumescent mass for closing the lead-in fixture in case of fire.

German Publication DE-2162251 discloses a lead-in fixture in which the intumescent mass, which is located within a length of a tubular partition insertable in a hole in the wall after the wall is formed, is limited by spaced from each other, circular metal discs which are axially secured in the wall. The intumescent mass surrounds the conduit.

Accordingly, an object of the present invention is to provide an embeddable tubular lead-in fixture which can be economically mass-produced and with which the intumescent action is limited to a small axially closed region.

SUMMARY OF THE INVENTION

This and other objects of the present invention, which will become apparent hereinafter, are achieved by providing a tubular lead-in fixture for a conduit and including an attachment means for a temporary attachment of the lead-in fixture to a formwork of a subsequently formed concrete wall, intumescent mass located within lead-in fixture coaxially therewith, and an axially extending, radially widening region provided within an embeddable length of the lead-in fixture and axially limited by spaced from each other radial shoulders for receiving the intumescent mass therein.

The axially limited, radially widening region within the embedded length of the lead-in fixture insures that in the wall that is subsequently formed by poured concrete, the intumescent mass is located in an undercut and is fireproof limited by concrete on both its axial and end sides, whereby a small axially closed region is formed. As a result, during the mass production, the limiting fireproof metal disc can be dispensed with. Thereby, associated with the provision of the metal disc, manufacturing and preassembly steps are eliminated. The relative axial length of the intumescent mass within the wall is affected rather insignificantly when the lead-in fixture is used for conduits formed of metal pipes which conduct heat well.

Advantageously, the receiving region has an axial length from a tenth up to a half of the inner diameter of the lead-in fixture. This length provides for a geometrical torus favorable to the intumescent effect.

Advantageously, the lead-in fixture is formed of at least practically free-flowing plastic material such as polypropylene, polyvinylchloride, alkylbensolsulfonat (PP, PVC, ABC) and the like. These materials permit the use of the injection-molding process which is particularly suitable for mass production.

Advantageously, the inventive lead-in fixture is formed of at least two, undercut-free, preferably identically shaped, sections whereby, during the manufacturing process a rigid intumescent mass and a simple injection-molding tool for forming undercut-free shapes can be used.

Advantageously, both sections approach each other during pre-assembly along associated guide means defined by cylindrical surfaces, which facilitates mounting of the lead-in fixture.

Advantageously, one section of the lead-in fixture is provided with a snap hook that engages a recess formed in the other section, whereby the two sections are secured to each other in their preassembly position. As a result a fixedly connected tubular lead-in fixture, which is ready for use, is provided.

Advantageously, the lead-in fixture is divided along its axis so that two sections in form of half-shells are formed which can be secured to each other in a space-saving manner.

Alternatively, the lead-in fixture is divided in the receiving region along a plane extending transverse to the fixture axis. The sections, in this case, are formed as annular, sealable sleeve sections which can be produced with a very simple rotationally symmetrical tool.

Advantageously, in the separated receiving region, there is provided a sealing diaphragm which is located adjacent to the intumescent mass. This insures an easy insertion of a diaphragm, which is adapted to the diameter of a particular conduit, before the lead-in fixture is mounted.

The novel features of the present invention, which are considered as characteristic for the invention, are set forth in the appended claims. The invention itself, however, both as to is construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
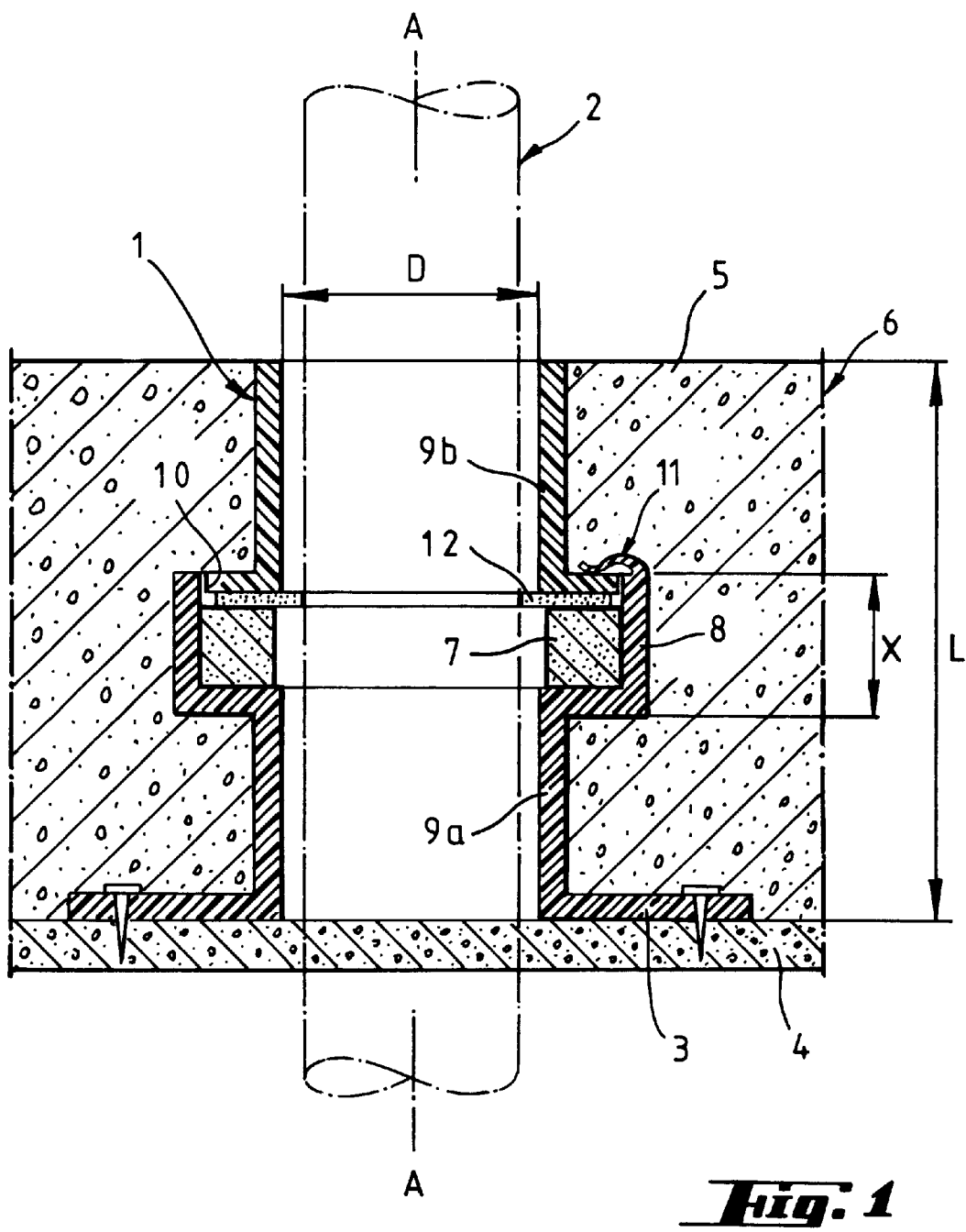
FIG. 1 a cross-sectional view of a first embodiment of a tubular lead-in fixture according to the present invention.

A tubular or sleeve-shaped lead-in fixture 1, which is shown in FIG. 1, is formed of a thermoplastic material and is designed for leading in of a conduit 2 formed of a metal pipe and having an axis A. The lead-in fixture 1 has a flange-shaped attachment means 3 that is nailed, during a temporary preassembly, to a formwork 4 of a subsequently formed of concrete, wall 6. The lead-in fixture 1 further includes intumescent mass 7 located in a radially widening receiving region 8 within an axial embeddable length L of the lead-in fixture 1. The axial length X of the intumescent mass-receiving region 8 corresponds approximately to a half of an inner diameter D of the lead-in fixture 1. The sleeve sections 9a and 9b, which form the lead-in fixture 1, approach each other along a guide 10 defined by cylindrical surfaces and are fixedly connected with each other by locking means 11 formed as a snap hook. The two sleeve sections 9a and 9b are separated from each other by a circular sealing diaphragm 12 which is located in the intumescent mass-receiving region 8 adjacent to the intumescent mass 7.

Figure 2:
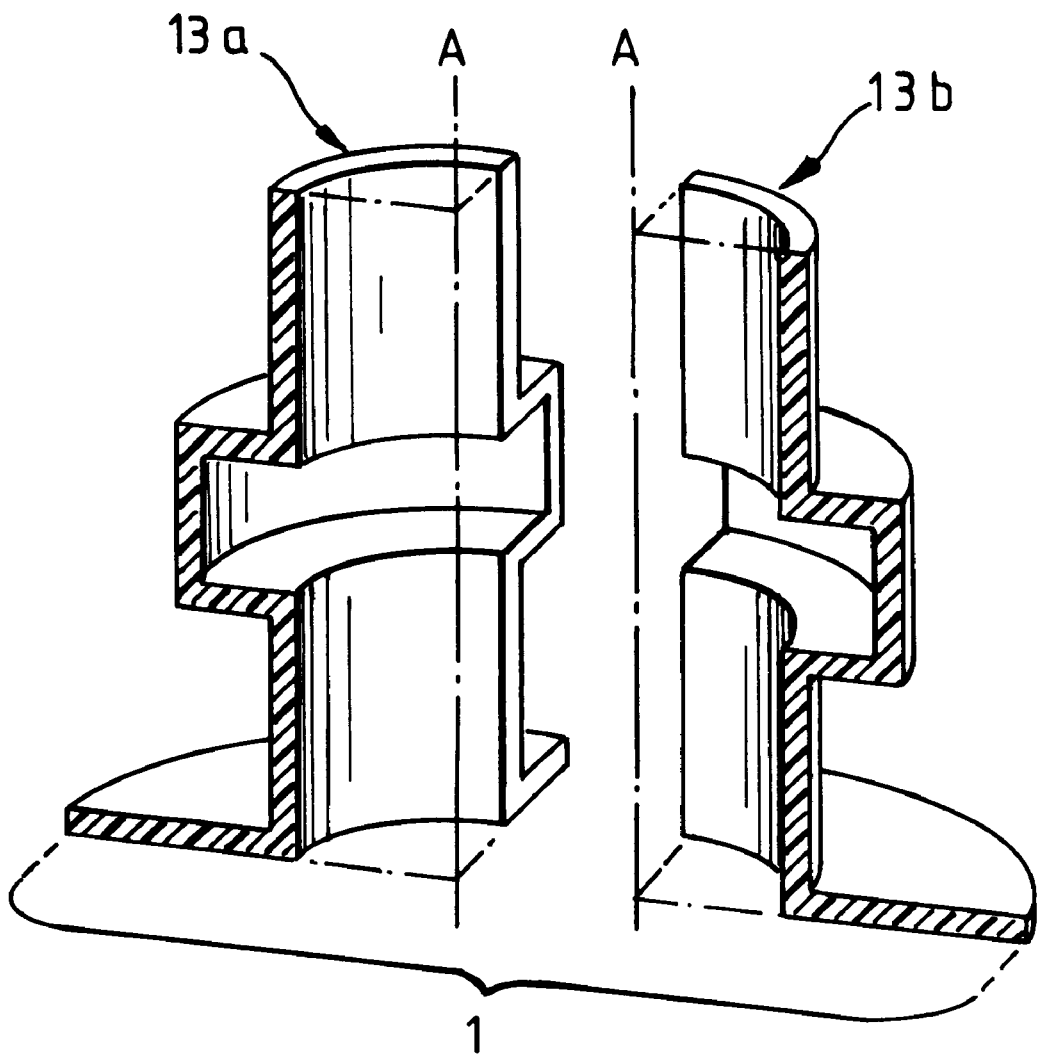
FIG. 2 a cross-sectional view of a second embodiment of a tubular lead-in fixture according to the present invention.

A tubular lead-in fixture 1, according to the embodiment shown in FIG. 2, is formed of two, divided along the axis A, identically shaped, undercut-free half-shells 13a, 13b.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A tubular lead-in fixture for a conduit (2), comprising attachment means (3) for a temporary art attachment of the lead-in fixture (1) to a formwork (4) of a subsequently formed of concrete, wall (6); intumescent mass (7) located within lead-in fixture coaxially therewith; and an axially extending, radially widening region (8) provided within an embeddable length (L) of the lead-in fixture (1) an axially limited by spaced from each other radial shoulders for receiving the intumescent mass (7) therein, wherein the lead-in fixture is formed of at least two, undercut-free sections.

2. A tubular lead-in fixture according to claim 1, wherein the receiving region (8) has an axial length (X) from a tenth to a half of an inner diameter (2) of the lead-in fixture.

3. A tubular lead-in fixture according to claim 1, wherein the lead-in fixture is formed of at least partially free-flowing plastic material.

4. A tubular lead-in fixture according to claims 1, wherein the at least two sections are identically shaped.

5. A tubular lead-in fixture according to claim 4, further comprising locking means (11) for retaining the two sections together in a preassembly position of the lead-in fixture.

6. A tubular lead-in fixture according to claim 1, further comprising guide means (10) for guiding the at least two sections toward each other during the temporary attachment of the lead-in fixture to the formwork (4).

7. A tubular lead-in fixture according to claim 1, wherein the two sections are divided along an axis (A) of the lead-in fixture.

8. A tubular lead-in fixture according to claim 1, wherein the two sections are divided, within the receiving region (8) along a plane extending transverse to an axis (A) of the lead-in fixture.

9. A tubular lead-in fixture according to claim 1, comprising a circular sealing diaphragm located in the receiving region (8) adjacent to the intumescent mass (7).

* * * * *